United States Patent [19]
Olds

[11] Patent Number: 5,887,257
[45] Date of Patent: Mar. 23, 1999

[54] HYBRID CONSTELLATION SATELLITE COMUNICATION SYSTEMS AND METHODS WITH EFFICIENT SIGNALING AND CONTROL

[75] Inventor: Keith Andrew Olds, Mesa, Ariz.

[73] Assignee: Motorola, Inc., Schaumburg, Ill.

[21] Appl. No.: 761,093

[22] Filed: Dec. 5, 1996

[51] Int. Cl.[6] .................................................. H04B 7/185
[52] U.S. Cl. .......................................... 455/427; 455/12.1
[58] Field of Search ................................. 455/12.1, 13.1, 455/13.2, 67.6, 427, 428, 430; 342/353, 352, 356

[56] References Cited

U.S. PATENT DOCUMENTS

| | | | |
|---|---|---|---|
| 4,985,706 | 1/1991 | Schukat | 342/352 |
| 5,119,225 | 6/1992 | Grant et al. | 455/12.1 |
| 5,287,541 | 2/1994 | Davis et al. | 455/12.1 |
| 5,722,042 | 2/1998 | Kimura et al. | 455/13.1 |

*Primary Examiner*—Reinhard J. Eisenzopf
*Assistant Examiner*—Marsha D. Banks-Harold
*Attorney, Agent, or Firm*—Harold C. McGurk

[57] ABSTRACT

A hybrid constellation satellite communication system (100) is established using two or more satellite types (110, 120) in different constellations. The two or more satellite types (110, 120) are connected to system control centers (140) via control links (105, 135) which provides a communication path from the satellite constellations to the system control centers (140). The two or more satellite types (110, 120) are also connected to subscriber equipment (150) via subscriber links (155, 145) which provides a communication path from the satellite constellations to the subscriber equipment (150). The first type of satellites (110) are interconnected using upper inter-satellite links (115). The second type of satellites (120) are interconnected using lower inter-satellite links (125). Control services and other time delay non-sensitive services are provided using communication channels established using the first type of satellites (110). Time delay sensitive services are provided using communication channels established using the second type of satellites (120). There are no inter-satellite links between satellites in the two different constellations.

27 Claims, 5 Drawing Sheets

//patents

HYBRID CONSTELLATION SATELLITE COMUNICATION SYSTEMS AND METHODS WITH EFFICIENT SIGNALING AND CONTROL

FIELD OF THE INVENTION

The present invention pertains to communication systems and, more particularly, to systems and methods for transmitting and receiving signals between satellites in communication systems.

BACKGROUND OF THE INVENTION

There are significant advantages to combining a constellation of Low Earth Orbit (LEO) satellites and a constellation of Geosynchronous (GEO) satellites to provide a global communication system. Many prior art systems have been proposed using a single constellation and some have been proposed which use two or more constellations.

In satellite communication systems there are generally two classes of signaling data which are used to support and control the subscriber services offered by the system. In-band signaling is carried in the control channel and is closely associated with the service channel. In general, associated control channels share the same physical resources as the service channels, so they are usually very low data rate channels to avoid over-taxing the service channel resources and impairing the ability of the system to generate revenue. Out-of-band signaling is sent using other physical resources than those being used by the service channels. These signaling channels may or may not be carrying signaling data that is associated with an active service session.

Prior art hybrid systems have limitations because these prior art systems have not taken full advantage of the strength and weaknesses of each constellation type. The GEO satellites in the systems are limited because of their fixed position. GEO satellites provide better equatorial coverage but have more delay associated with them. Individual LEO satellites have limited coverage because of their relatively low altitude. LEO constellations provide better non-equatorial coverage and less delay.

What are needed are a method and apparatus which overcome these limitations and allow more efficient and less costly satellite communication systems to be constructed.

DETAILED DESCRIPTION OF A PREFERRED EMBODIMENT

Figure 1:
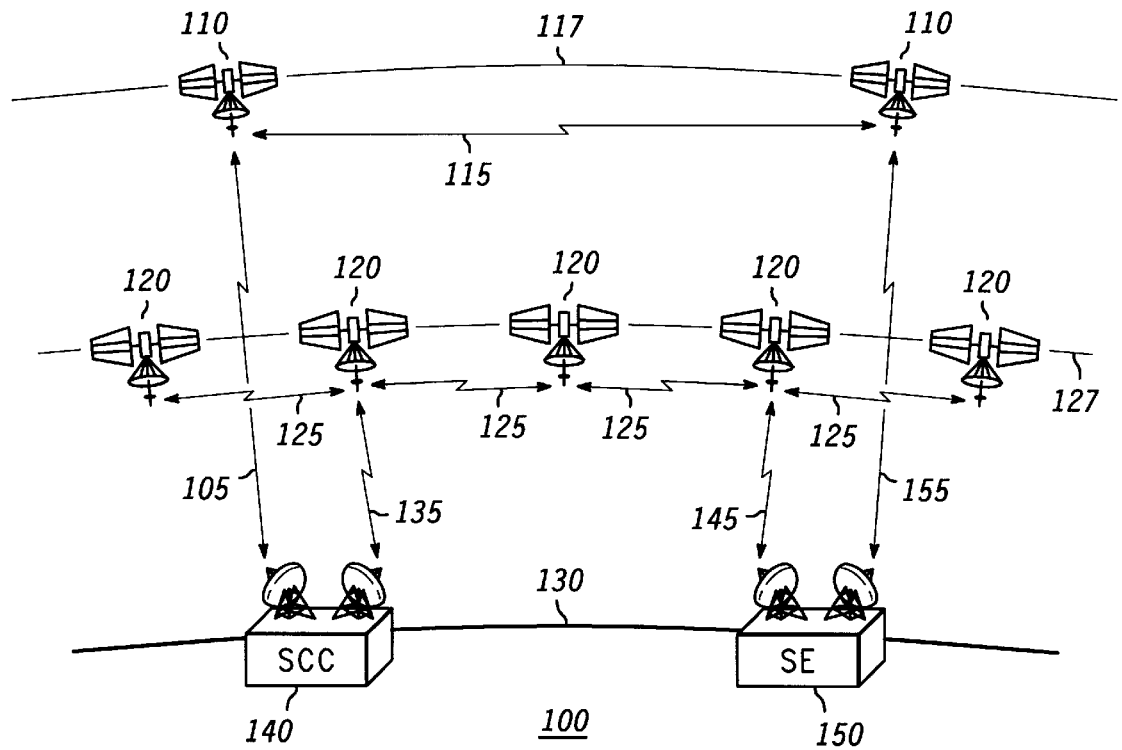
FIG. 1 shows a block diagram of a hybrid constellation satellite communication system in accordance with a preferred embodiment of the present invention.

The methods and systems of the present invention overcome these limitations and allow more efficient and less costly satellite communication systems to be constructed. The method and apparatus of the present invention take advantage of the strengths of each constellation type and avoid many of the weaknesses of each individual constellation type. A hybrid constellation of this type, however, requires coordination of services and constellation control to realize these advantages.

The method and apparatus of this present invention provides a hybrid satellite system that includes an efficient control and signaling subsystem that efficiently manages the services provided by the system. In a preferred embodiment of the present invention, the hybrid satellite system contains a GEO constellation and a LEO constellation. For example, delay sensitive services are routed over the LEO constellation which has little propagation delay and non-delay sensitive services and signaling are routed over the GEO satellites because of their stability and generally large capacity.

The method and apparatus of the present invention also has other advantages. One advantage is that there are no inter-satellite links between the LEO and the GEO satellites. The coordination between the two constellations is done without a direct inter-satellite link between them. A second advantage is that a staged deployment strategy can be used which improves the financial performance of the system.

In a preferred embodiment of the present invention, the initial acquisition and signaling is always through the higher delay path which is typically a GEO constellation. In addition, the services are divided between the two constellations according to their delay sensitivity. For example, time delay sensitive services are provided by the LEO constellation, and time delay non-sensitive services are provided by the GEO constellation. Also, the coordination and control of the two constellations is performed in the system control center (SCC). In alternate embodiments, the reason for choosing a particular constellation to provide services could be better fade margin performance or better link performance over populated areas.

In a preferred embodiment of the present invention, the system control center (SCC) is divided into three parts: the network control system (NCS), the GEO constellation control system (GCS), and the LEO constellation control system (LCS). The GCS and the LCS perform traditional satellite management functions for the two satellite constellations.

The NCS operates the network and provides the services. Most of the NCS functions are standard network management and service control functions.

In a preferred embodiment of the present invention, the SCC provides a unique method for directing the signaling and services through the network. As mentioned previously, nearly all of the signaling is sent over the GEO constellation, thereby, saving valuable LEO resources for revenue-bearing services. The LEO resources are more valuable because they support delay sensitive services, and, therefore, the channel resources must be available to support these service on demand. The NCS portion of the SCC also ensures that the correct services are routed on the LEO and GEO constellations.

In a preferred embodiment of the present invention, a higher value is placed on the LEO resources. Because the higher value is placed on the LEO resources, the system control channels are supported by the GEO constellation. Not only does this use the less time critical GEO resources, but it also provides a more stable control channel environment. The control channels are used by the subscriber equipment (SE) to gain access to the network. The control channels are used by the system to alert an SE that it has pending service requests. The relative stability of the GEO satellites is a significant advantage relative to the LEO satellites. Because of the location of the GEO satellites is reasonably fixed, the SE may easily employ directional antennas, can easily and accurately predict the propagation delay to the satellite and does not have to contend with large Doppler shifts in the satellite frequency. The SE must deal with all of these issues if it uses the LEO satellites for system acquisition.

FIG. 1 shows a block diagram of a hybrid constellation satellite communication system in accordance with a preferred embodiment of the present invention. Constellations, for example, can be distinguished by the number of satellites and/or the altitude at which the satellites are positioned. In a preferred embodiment of the present invention, the hybrid constellation satellite communication system 100 comprises a constellation of GEO satellites 110, a constellation of LEO satellites 120, system control center (SCC) 140 and subscriber equipment (SE) 150. SCC 140 has three major subsystems: the NCS, LCS, and GCS. In a preferred embodiment, SCC 140 is shown as a single entity. Those skilled in the art will recognize that the operations performed by SCC 140 could be distributed to other entities. The satellites in each constellation are interconnected via a network of inter-satellite links (ISLs), but the two constellations are not connected by ISLs. The first type of satellites 110 are interconnected using ISL 115 and are shown in orbit 117 above the surface of the earth 130. The second type of satellites 120 are interconnected using ISL 125 and are shown in orbit 127.

Both constellations have connections to the SE 150 via two-way earth to space subscriber links and to SCC 140 via two-way earth to space control links. Subscriber links 145 provide service channels between SE 150 and satellites 120 in the LEO constellation. Subscriber links 155 from SE 150 to satellites 110 in the GEO constellation provide service channels and control channels. Control links 135 provide service channels between SEs 150 and satellites 120 in the LEO constellation. Control links 105 from SEs 150 to satellites 110 in the GEO constellation provide service channels and control channels. The ISLs provide a network for carrying services and control data anywhere on the earth or in the constellations.

Hybrid constellation satellite communication system 100 can include special classes of SEs, but these special classes of SEs are not required for the present invention. For example, a special class of SE could be a gateway that allows interconnection to a public switched telecommunications network (PSTN), but the special features of these gateway SEs are not important to the present invention. SEs can be fixed or mobile. Since mobile SEs are permitted in the system, then the NCS may include mobility management software which is necessary in a mobile wireless communication system.

Figure 2:
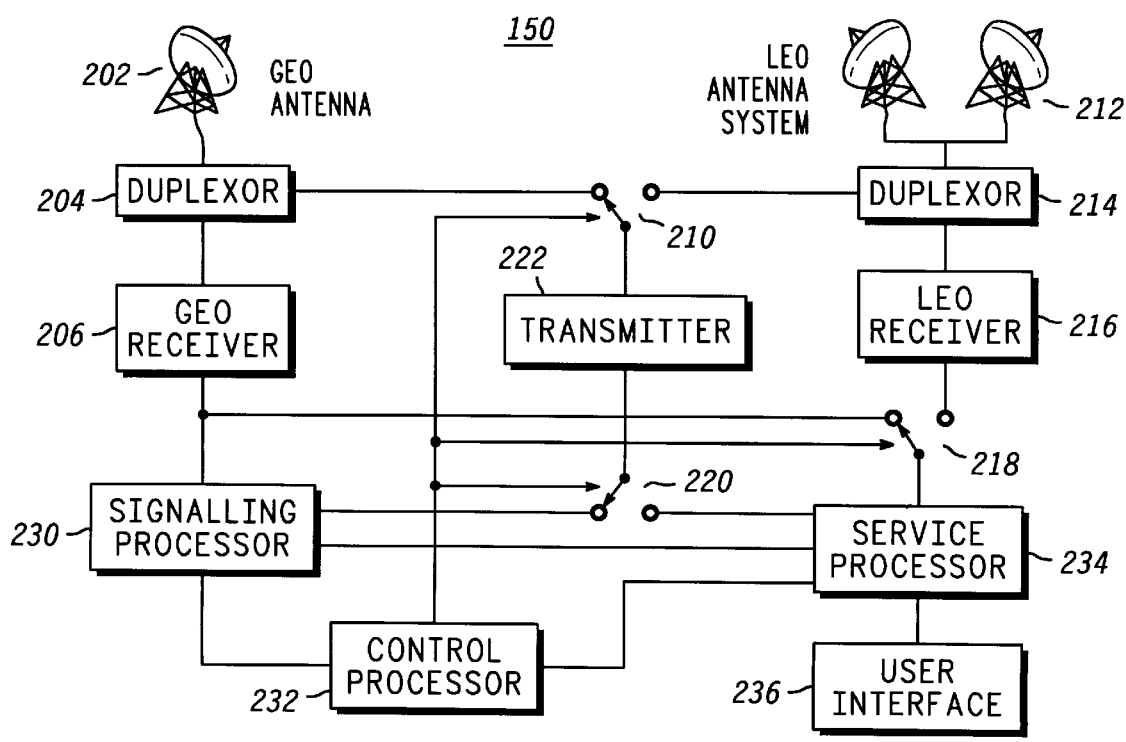
FIG. 2 shows a block diagram of a subscriber equipment in accordance with a preferred embodiment of the present invention.

FIG. 2 shows a block diagram of a subscriber equipment in accordance with a preferred embodiment of the present invention. Subscriber equipment (SE) 150 comprises a transceiver which comprises: GEO antenna 202, GEO duplexor 204, GEO receiver 206, switch 210 to select duplexors, LEO antenna system 212, LEO duplexor 214, LEO receiver 216, switch 218 to select receivers, and transmitter 222. SE also comprises: a processor which comprises: switch 220 to select processors, signaling processor 230, service processor 234, and control processor 232, and user interface 236. In a preferred embodiment, at least a two channel SE is required. For example, SE 150 includes two antenna systems, a fixed high gain GEO antenna and a lower gain two beam-steered LEO antenna subsystem.

GEO antenna 202 is used to communicate with satellites 110 (FIG. 1) and is coupled to GEO duplexor 204. GEO duplexor 204 provides a separate single function port for the transmission function, a separate single function port for the reception function, and a dual function port for the antenna function. GEO receiver 206 provides the necessary signal conversion to provide data to the processors. The GEO receiver 206 is permanently connected to the signaling processor 230. Signaling processor 230 processes data used to provide signaling services.

LEO antenna system 212 is used to communicate with satellites 120 (FIG. 1) and is coupled to LEO duplexor 214. LEO duplexor 214 is a three-port device which is used to both separate and combine the transmit and receive functions. One port on LEO duplexor 214 is connected to LEO antenna system 212. A second port is connected to switch 210, and a third port is connected to LEO receiver 216. Switch 210 connects transmitter 222 to either one of the duplexors. Switch 210 is also coupled to control processor 232 which determines when switch 210 switches. In a preferred embodiment, a single transmitter is used, and transmitter 222 is switched between GEO duplexor 204 and LEO duplexor 214. In a preferred embodiment, the LEO and GEO transmit frequencies are close together, and a single RF section and power amplifier is operated with both constellations.

Transmitter 222 is also coupled to switch 220 which is used to select either signaling processor 230 or service processor 234. Switch 220 is used to select which type of signals are to be transmitted. In one case, signals containing service information are selected, and in another case, signals containing signaling information are selected.

Switch 218 has two input ports which are connected to GEO receiver 206 and LEO receiver 216. Switch 218 has a single output port which is connected to service processor 234. Service processor 234 is used to process service information from either the GEO receiver 206 or the LEO receiver 216. Control processor 232 is used to control the switch state for switch 218. Control processor 232 is coupled to signaling processor 230 and service processor 234. User interface 236 is coupled to service processor 234.

Figure 3:
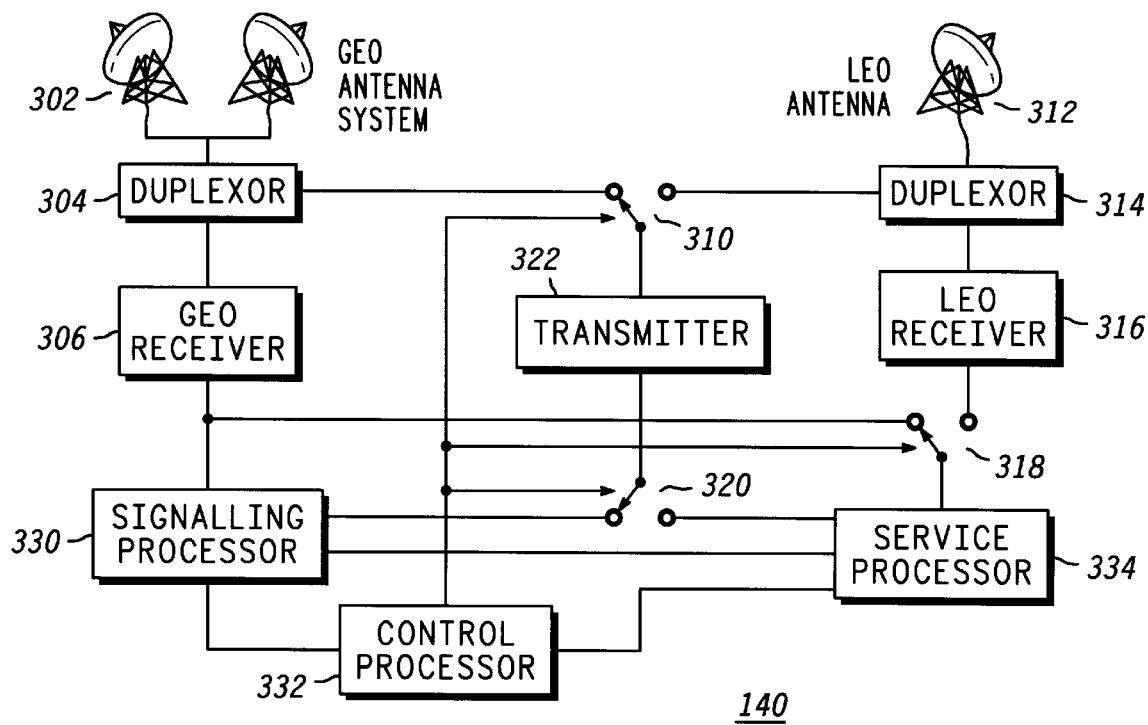
FIG. 3 shows a block diagram of a system control center in accordance with a preferred embodiment of the present invention.

FIG. 3 shows a block diagram for a system control center in accordance with a preferred embodiment of the present invention. System control center 140 comprises: GEO antenna 302, GEO duplexor 304, GEO receiver 306, switch 310 to select duplexors, LEO antenna system 312, LEO duplexor 314, LEO receiver 316, switch 318 to select receivers, transmitter 322, switch 320 to select processors, signaling processor 330, service processor 334, and control processor 332. In a preferred embodiment, at least a two channel SCC is required. For example, SCC 140 includes two antenna systems. The first could be a GEO antenna subsystem with at least two fixed high gain GEO antennas, and the second could be a lower gain beam-steered LEO antenna. GEO antenna 302 is used to communicate with satellites 110 (FIG. 1) and is coupled to GEO duplexor 304. GEO duplexor 304 provides separate single function ports for the transmission function, a separate single function port for the reception function and a dual function port for the antenna function. GEO receiver 306 provides the necessary signal conversion to provide data to the processors. GEO receiver 306 is coupled to signaling processor 330. Signaling processor 330 processes data used to provide signaling services.

LEO antenna system 312 is used to communicate with satellites 120 (FIG. 1) and is coupled to LEO duplexor 314. LEO duplexor 314 is a three-port device which is used to both separate and combine the transmit and receive functions. One port on LEO duplexor 314 is connected to LEO antenna system 312. A second port is connected to switch 310, and a third port is connected to LEO receiver 316. Switch 310 is used to connect transmitter 322 to either one of the duplexors. Switch 310 is also coupled to control processor 332 which determines when switch 310 switches. In a preferred embodiment, a single transmitter is used, and transmitter 322 is switched between GEO duplexor 304 and LEO duplexor 314. In a preferred embodiment, the LEO and GEO transmit frequencies are close together, and a single RF section and power amplifier is operated with both constellations.

Transmitter 322 is also coupled to switch 320 which is used to select either signaling processor 330 or service processor 334. Switch 320 is used to select which type of signals are to be transmitted. In one case, signals containing service information are selected, and in another case, signals containing signaling information are selected.

Switch 318 has two input ports which are connected to GEO receiver 306 and LEO receiver 316. Switch 318 has a single output port which is connected to service processor 334. Service processor 334 processes service information from either GEO receiver 306 or LEO receiver 316. Control processor 332 controls the switch state for switch 318. Control processor 332 is coupled to signaling processor 330 and service processor 334.

Figure 4:
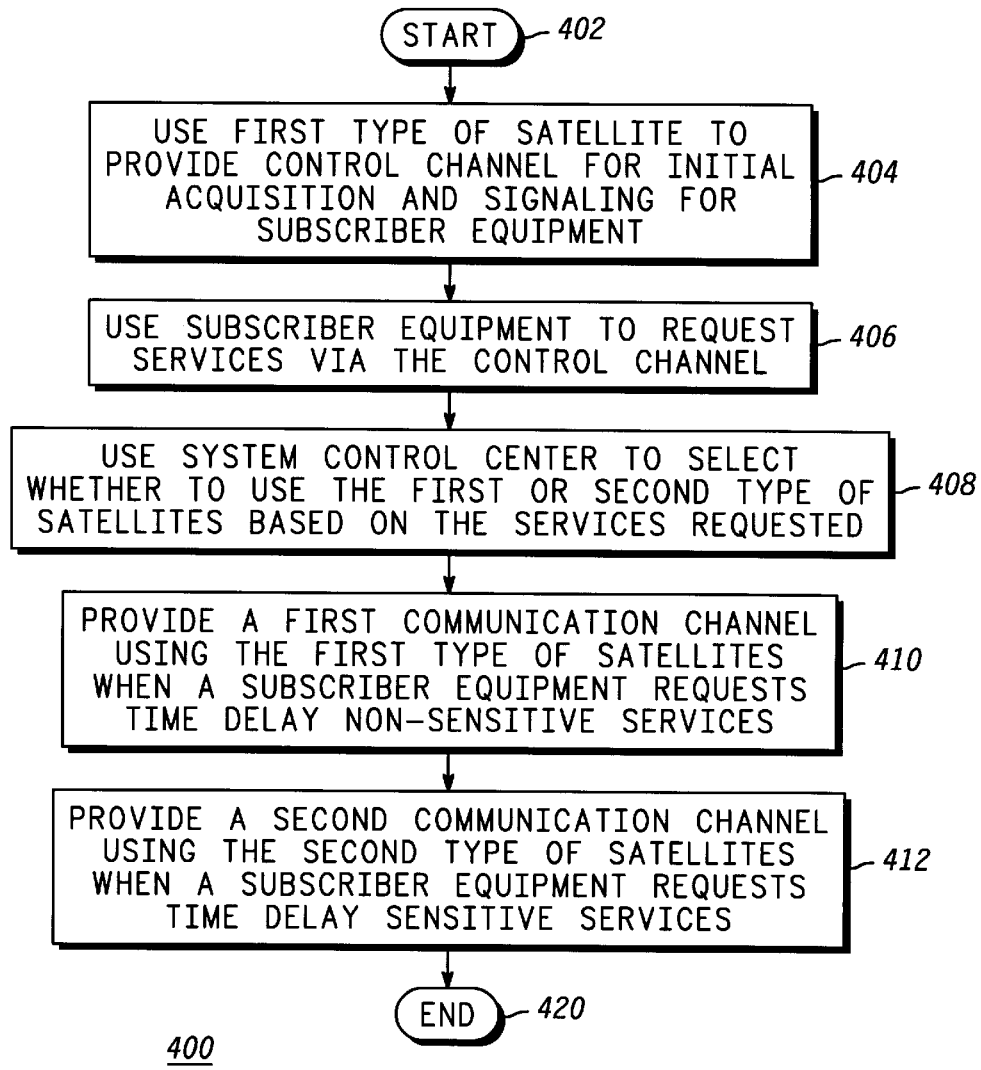
FIG. 4 shows a flowchart of a method for operating a hybrid constellation satellite communication system in accordance with a preferred embodiment of the present invention.

FIG. 4 shows a flowchart of a method for operating a hybrid constellation satellite communication system in accordance with a preferred embodiment of the present invention. Method 400 starts with step 402. In step 404, a GEO satellite is used to provide a control channel for initial acquisition and signaling services for a subscriber equipment. In step 406, a subscriber equipment through the GEO satellite requests services via the control channel that was previously provided.

In step 408, a system control center selects whether to use at least one GEO satellite or a number of LEO satellites for a communication channel based on the requested services.

In step 410, a first communication channel for time delay non-sensitive services is provided between two of the subscriber equipment using at least one GEO satellite, when the subscriber equipment requests the communication channel for the time delay non-sensitive services.

In step 412, a second communication channel for time delay sensitive services is provided between two of the subscriber equipment using a number of LEO satellites, when the subscriber equipment requests the communication channel for the time delay sensitive services.

An example system could operate as described below. An SE monitors downlink channels from a local GEO satellite. A local GEO satellite is one within view of a GEO antenna on a SE. An originating SE transmits a message over a random access channel. A random access channel, for example, can use a protocol that allows the SE to establish communications with a satellite without previously co-originating with other SEs or with other satellites. A random access channel is one of many channels which can be established between a GEO satellite and an SE.

Next, a GEO satellite receives a message and processes it. The GEO satellite could determine if the message has been processed properly. If the message has not been processed properly, then example operation would end.

When the message has been processed properly, the local GEO satellite could send an acknowledge message back to the originating SE and forwards the message to the network control system portion of SCC.

When the system control center receives the forwarded message, it could process the message to determine the contents of the message. If the originating SE is not a valid subscriber, then a message is sent back to the originating SE through the local GEO satellite, and processing ends. As an example, this message could be an access denial message.

If the originating SE has been confirmed as a valid subscriber, the SCC locates the terminating SE and sends an inquiry to the GEO satellite that is local to the terminating SE. The inquiry is sent using GEO satellites and inter-satellite links if the terminating SE is not within view of the GEO satellite which is local to the originating SE.

Next, the terminating SE could receive the inquiry and respond to the inquiry. For example, a terminating SE can respond with a not available message or a ready message. The terminating SE could send a response message to the GEO satellite which is local to the terminating SE. The response is sent to the system control center by the local GEO satellite using GEO satellites and inter-satellite links if the terminating SE is not within view of the system control center or is not within view of the GEO satellite which is local to the originating SE.

Continuing with the example, the system control center could determine if the services requested are delay sensitive. If the requested services are not delay sensitive, then the requested service are provided by the GEO satellites and inter-satellite links, and the example process ends.

When the requested services are determined to be delay sensitive, then the system control center determines the best LEO satellites to use and selects the best channels to use. In addition, the SCC determines the best routing to use. SCC also sends information to the LEO satellites. For example, this information could contain routing information to be used by the LEO satellites.

Next, the system control center could send messages to both the originating and terminating SEs. These messages contain information about which LEO satellite to use and which channel to use. Both the terminating SE and the originating SE could establish communication links with LEO satellites. Information is then exchanged between the originating SE and the terminating SE using LEO satellites and inter-satellite links as required.

When one of the SEs determines that the LEO satellite which it is using for the channel is moving out of view, then a hand-off to another LEO satellite is required. SE could send a hand-off message to the SCC. In a preferred embodiment, the message could be sent via the LEO satellites. In an alternate embodiment, the hand-off request message could be sent via the GEO satellites.

Next, the system control center could receive the hand-off request message and determine a new LEO satellite to use and a new channel to use. Then, the system control center sends messages to both SEs to inform the SEs about the changes. The system control center must inform the SE which requested the hand-off which new satellite and channel to use. The system control center also informs the other SE about the routing changes.

Example operation continues with time delay sensitive services being maintained until a termination request is made. The system control center could receive a termination message from either the originating SE or the terminating SE. Also, the system control center could determine there is a need to send termination messages to the SEs. For example, the originating SE can send a termination message when all of the information it wanted to send to the terminating SE has been sent. Also, the terminating SE can determine that it no longer needs to exchange information with the originating SE, and it sends a termination message to the system control center. In addition, the system control center can be responsible for determining whether a termination message needs to be sent because there is a network problem. A termination message could be used to end processing in the example method of operation.

Figure 5:
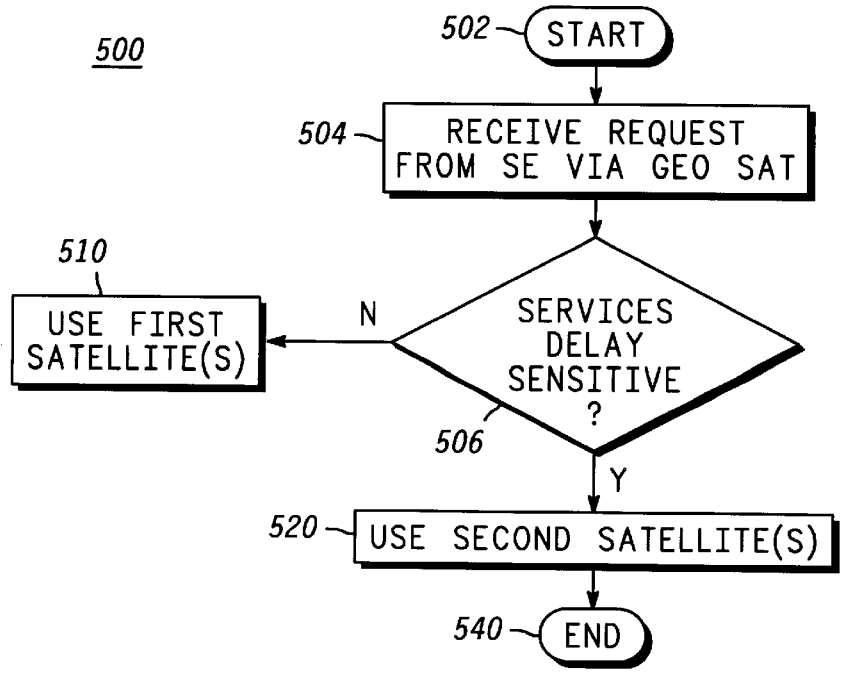
FIG. 5 shows a flowchart of a method for operating a system control center in a hybrid constellation satellite communication system, in accordance with a preferred embodiment of the present invention.

FIG. 5 shows a flowchart of a method for operating a system control center in a hybrid constellation satellite communication system in accordance with a preferred embodiment of the present invention. Method 500 starts with step 502. In step 504, the system control center receives a request from an originating subscriber equipment to establish a communication channel between the originating subscriber equipment and a terminating subscriber equipment. In step 506, the system control center determines if the request requires time delay sensitive services.

When step 506 is false, method 500 branches to step 510 in which the system control center provides a communication channel for time delay non-sensitive sensitive services between the originating subscriber equipment and the terminating subscriber equipment using a number of GEO satellites.

When step 506 is true, method 500 branches to step 520 in which the system control center provides a communication channel for time delay sensitive services between the originating subscriber equipment and the terminating subscriber equipment using at least one LEO satellite.

In addition, the system control center uses at least one of the GEO satellites to provide a control channel for initial acquisition and signaling services for the originating subscriber and the terminating subscriber equipment. Also, the system control center monitors the control channel and the communication channel.

In an example system, operation could be as described below. The system control center monitors the downlink channels from a local GEO satellite. A local GEO satellite is one within view of a GEO antenna on the system control center. An originating SE could transmit a message over a random access channel to system control center.

Next, a system control center could receive the message from the GEO satellite and processes it. The system control center could determine if the originating SE is a valid subscriber. If the originating SE is not a valid subscriber, then a message is sent back to the originating SE through the local GEO satellite. As an example, this message could be an access denial message.

When the originating SE has been confirmed as a valid subscriber, the system control center could locate the terminating SE and determine if it is available. For example, the SCC can check an active connection file to determine if the terminating SE is busy. If the terminating SE is busy, then a busy message can be sent to the originating SE via the local GEO satellites. If the terminating SE is not busy, then the SCC sends a call set-up message to the terminating SE via the GEO satellite that is local to the terminating SE. Then, the system control center could send the call set-up message to the terminating SE using the GEO satellites and the inter-satellite links.

The system control center could then receive the response to the call set-up message from the terminating SE via the GEO satellites. For example, a terminating SE could respond with a not available message or a ready message. The response could be sent to the system control center by the local GEO satellite using the GEO satellites and the inter-satellite links if the terminating SE is not within view of the system control center or is not within view of the GEO satellite which is local to the originating SE. If a not available message is received or if no message is received from the terminating SE, the SCC sends the not available message to the originating SE and ends the session.

The example operation continues if a ready message is received. Then, the system control center could determine if the services requested are delay sensitive. If the requested services are not delay sensitive, the system control center provides the requested service using the GEO satellites and the inter-satellite links, and example operation would end.

When the requested services are determined to be delay sensitive, the system control center could determine the best LEO satellites to use and selects the best channels to use. In addition, the system control center could determine the best routing to use and send the information to the LEO satellites. For example, this information could contain routing information to be used by the LEO satellites.

Next, the system control center could send messages to both the originating and terminating SEs. These messages contain information about which LEO satellite to use and which channel to use. The system control center could monitor the terminating SE, the originating SE, the LEO satellites, and the communication links between the LEO satellites while information is exchanged between the originating SE and the terminating SE.

If the system control center receives a hand-off request from one of the SEs, the system control center could determine a new LEO satellite and channel to use. In a preferred embodiment, the message could be sent via the LEO satellites. In an alternate embodiment, the hand-off request message could be sent via the GEO satellites. Then, the system control center could send messages to both SEs to inform the SEs about the changes. The system control center must inform the SE which requested the hand-off which new satellite and channel to use. The system control center also informs the other SE about the routing changes.

As the time delay sensitive services are maintained, the system control center continues to monitor the SEs and the satellites. The system control center could receive a termination message from either the originating SE or the terminating SE. The system control center could also determine there is a need to send termination messages to the SEs. For example, the originating SE can send a termination message when all of the information it wanted to send to the terminating SE has been sent. Also, the terminating SE can determine that it no longer needs to exchange information with the originating SE, and it sends a termination message to the system control center. In addition, the system control center can be responsible for determining a termination message needs to be sent because there is a network problem.

In response to a termination message, the system control center could remove the SEs from the active connection file, create a call record, determine the required billing information, and release the resources that were being used. A termination message could be used to end operation in the example system.

Figure 6:
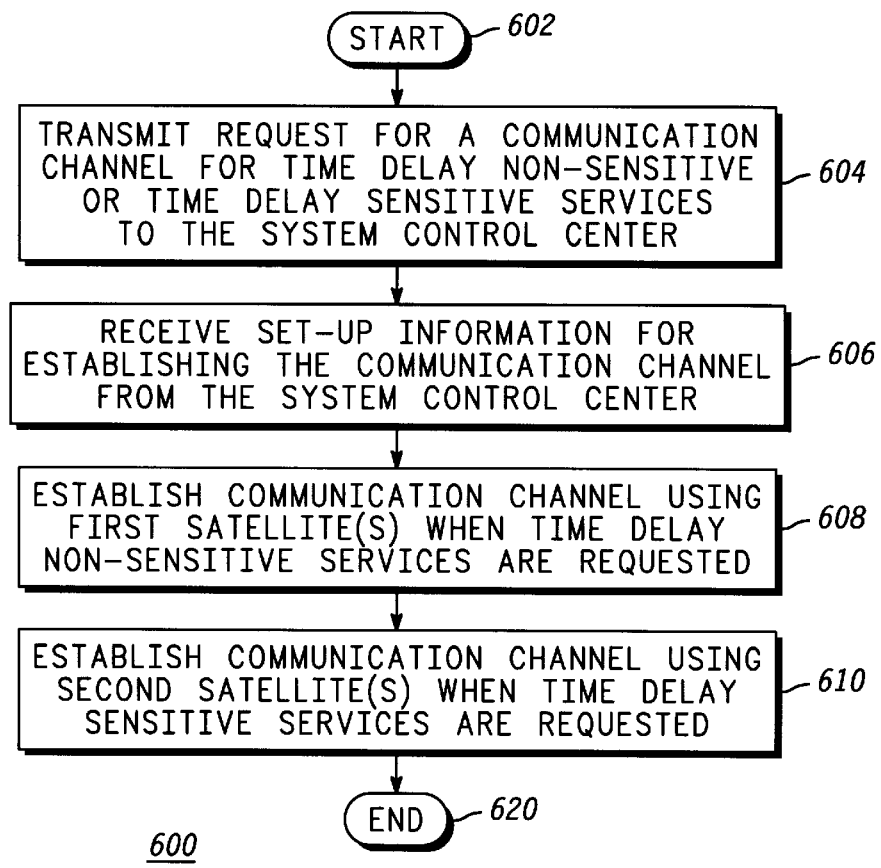
FIG. 6 shows a flowchart of a method for operating subscriber equipment in a hybrid constellation satellite communication system in accordance with a preferred embodiment of the present invention.

FIG. 6 shows a flowchart of a method for operating subscriber equipment in a hybrid constellation satellite communication system in accordance with a preferred embodiment of the present invention. Method 600 starts with step 602. In step 604, an originating subscriber equipment transmits a request for a communication channel between the originating subscriber equipment and a terminating subscriber equipment. The request can be for time delay non-sensitive services or time delay sensitive services. In step 606, the subscriber equipment receives set-up information for establishing the communication channel. In step 608, the communication channel is for time delay non-sensitive services, therefore the subscriber equipment communicates with a GEO satellite using the set-up information. In step 610, the communication channel is for time delay sensitive services, so the subscriber equipment communicates with a LEO satellite using the set-up information. Method 600 ends in step 620.

In addition, at least one GEO satellite is used to provide a control channel for initial acquisition and signaling services for the originating subscriber and the terminating subscriber equipment. The subscriber equipment also can monitor the control channel and the communication channel.

Subscriber equipment can operate in a variety of ways when used in a hybrid constellation satellite communication system. Some of these methods of operation are described below. SEs 150 can monitor downlink channels from a local GEO satellite. A local GEO satellite is one within view of GEO antenna 202 (FIG. 2) on SE 150 (FIG. 1). An SE can determine that it needs to establish a communication channel to another subscriber equipment. This originating SE transmits a message over a random access channel. A random access channel is one of many channels which can be established between a GEO satellite and an SE. The message contains information about the type of service required and identification of the terminating SE.

The originating SE can receive an acknowledgment from the SCC and wait for the SCC to respond with additional information. While the SE waits, the SCC locates the terminating SE and determines if it is busy or not and sets it up to receive more information.

The originating SE can receive a message. In this case, the message could contain the response to a request to establish a communication link to a terminating SE, or the message could contain information about establishing a communication link to a particular satellite. The message could also be received by a terminating SE. In this case, the message could contain an inquiry which was sent by an originating SE, or the message could contain information about establishing a communication link to a particular satellite.

The SE can establish a communication channel with the particular satellite that was determined for it by the SCC. Both the originating and the terminating SE act as instructed. If the SCC instructed the SEs to establish communication links with LEO satellites, then subscriber link 145 (FIG. 1) is established by the originating SE and another subscriber link 145 is established by the terminating SE. If the SCC instructed the SEs to establish communication links with GEO satellites, then subscriber link 155 (FIG. 1) is established by the originating SE, and another subscriber link 155 is established by the terminating SE.

After both the terminating SE and the originating SE establish communication links with the proper satellites, information can be exchanged between the originating SE and the terminating SE. If the information is delay sensitive, then the information is exchanged using LEO satellites and inter-satellite links as required. If the information is not delay sensitive, then the information is exchanged using GEO satellites and inter-satellite links as required.

Both the originating and terminating SE can monitor LEO satellites to ensure that subscriber links 145 are not broken due to movement between the satellites and the SEs. If one of the SEs determines that the LEO satellite which it is using for the channel is moving out of view, then the SE concludes that a hand-off to another LEO satellite is required. The SE sends a hand-off message to the SCC. In a preferred embodiment, the message is sent via the LEO satellites. In an alternate embodiment, the hand-off request message could be sent via the GEO satellites.

The SE can wait for the system control center to respond with the hand-off information which contains a new LEO satellite to use and a new channel to use. Both SEs can receive messages to inform them about the changes required for the hand-off. The system control center must inform the SE which requested the hand-off which new satellite and channel to use. The system control center also informs the other SE about the routing changes. The SE can establish the new link as instructed and release the resources used in the old link.

Services can be maintained until a termination request is made. Communication service data is exchanged between an originating SE and a terminating SE. As an example, in a one-way data transfer, a terminating SE could be instructed not to send data.

Either the originating SE or the terminating SE can determine there is a need to send termination messages to the SCC. For example, the originating SE can send a termination message when all of the information it wants to send to the terminating SE has been sent. Also, the terminating SE can determine that it no longer needs to exchange information with the originating SE, and it sends a termination message to the system control center.

The SE can send a termination message to the SCC. If this occurs, the SCC releases resources that were being used and removes the SEs from the active connection file.

Figure 7:
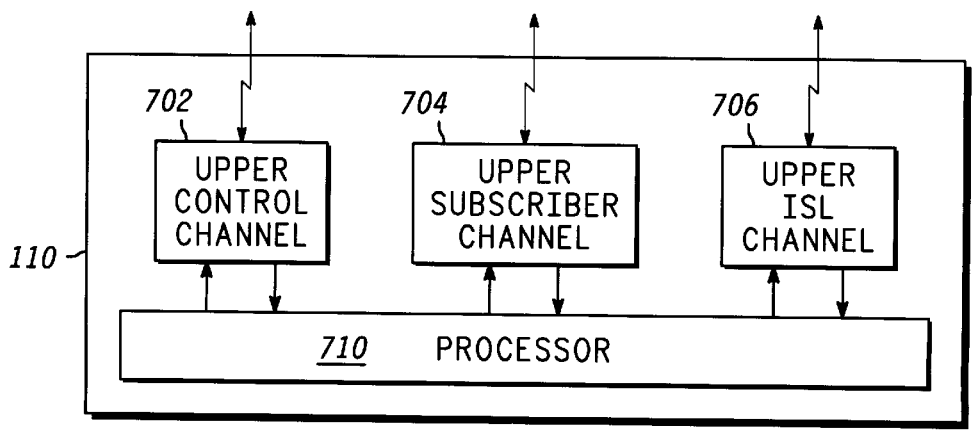
FIG. 7 shows a block diagram of a GEO satellite in accordance with a preferred embodiment of the present invention.

FIG. 7 shows a block diagram of a GEO satellite in accordance with a preferred embodiment of the present invention. The GEO satellite comprises: upper control channel 702, upper subscriber channel 704, upper inter-satellite link (ISL) channel 706, and processor 710. Upper control channel 702 is for communicating with a system control center when a system control center is locally available. Upper subscriber channel 704 is for providing a control channel for initial acquisition and signaling services communicating with a subscriber equipment, and for communicating with the subscriber equipment for time delay non-sensitive services. Upper inter-satellite link (ISL) channel 706 is for establishing and monitoring a inter-satellite link to another GEO satellite when the another GEO satellite is available.

Processor 710 processes messages received on any links, determines if the messages contain routing information, re-transmits some of the messages, and performs operations using information contained in the messages which are not re-transmitted.

Figure 8:
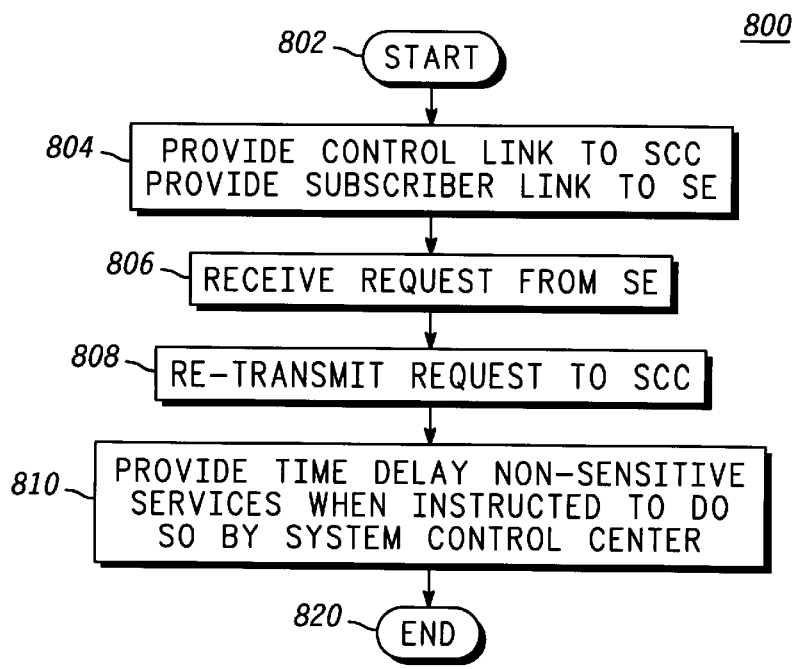
FIG. 8 shows a flowchart of a method for operating a first satellite in a hybrid constellation satellite communication system in accordance with a preferred embodiment of the present invention.

FIG. 8 shows a flowchart of a method of operating a GEO satellite in a hybrid constellation satellite communication system in accordance with a preferred embodiment of the present invention. Method 800 starts with step 802. In step 804, a GEO satellite provides control link 105 (FIG. 1) to SCC 140 (FIG. 1), and the GEO satellite provides subscriber link 155 (FIG. 1) to SE 150 (FIG. 1).

In step 806, the GEO satellite receives a request to establish a call from a subscriber equipment. In step 808, the GEO satellite re-transmits the request to a system control center. In step 810, the GEO satellite establishes and monitors a communication channel with subscriber equipment when instructed to do so by a system control center. The system control center has provided information to establish a communication channel for time delay non-sensitive services.

The GEO satellite establishes and monitors a control link to a system control center when the system control center is locally available. The control link to the system control center is used to re-transmit a first type of message to the system control center and to receive a second type of message from the system control center. In addition, the GEO satellite establishes and monitors a subscriber link to a subscriber equipment when the subscriber equipment is locally available. The subscriber link to the subscriber equipment is used to receive the first type of message from the subscriber equipment and to retransmit the second type of message to the subscriber equipment. For example, the first type of message could be request messages, acknowledge messages, or information messages. The second type of messages could be control messages or set-up messages.

For example, the GEO satellite could receives message from an originating SE transmitted over a random access channel. A random access channel is one of many channels which can be established between the GEO satellite and an SE. A GEO satellite could send an acknowledge message to the originating SE. The GEO satellite could forward the message to the SCC.

A second GEO satellite which is local to a terminating SE can receive a message from the SCC. This second GEO satellite could forward the message to the terminating SE. The second local GEO satellite can receive a response message from the terminating SE. The response could be not available or ready. The second local GEO satellite could send an acknowledgment message to the terminating SE and forwards the response message to the SCC.

In addition, local GEO satellites can receive information about how to set-up the communication channels. If the services are not delay sensitive, the GEO satellites can provide the communication services.

When the services are delay sensitive, the SCC can send information to both local GEO satellites. One local GEO satellite sends a message to the originating SE. This message contains information about what satellite to use, what channel to use, and the routing to use. The second GEO satellite, which is local to the terminating SE, sends a message to the terminating SE. This message contains information about what satellite to use, what channel to use, and the routing to use.

The GEO satellite can monitor the control link with the system control center to determine if a hand-off message is sent. In an alternate embodiment, the hand-off request message could be sent via the GEO satellites. In a handoff operation, the system control center receives the hand-off request message and determines a new LEO satellite to use and a new channel to use. GEO satellites are used by the SCC to send messages to both SEs to inform the SEs about the changes. In another alternate embodiment, the hand-off information could be sent via the LEO satellites. The system control center must inform the SE which requested the hand-off which new satellite and channel to use. The system control center also informs the other SE about the routing changes.

Those skilled in the art will recognize that other hand-off techniques are available for operating the SEs with a LEO satellite system. For example, the SCC could compute all hand-offs and hand-off times at the time when the first connection is established. The present invention is capable of operating with a variety of hand-off procedures, and the present invention does not require a particular hand-off procedure.

The GEO satellite can also monitor the channel with the system control center to determine if a termination message is sent. In a preferred embodiment, the termination message is sent via the GEO satellites. In an alternate embodiment, the termination message could be sent via the LEO satellites. In a termination operation, the system control center receives the termination message or determines the need to terminate the communication services. GEO satellites are used by the SCC to send termination messages to both SEs. The GEO satellites can also perform maintenance tasks. For example, these maintenance tasks can include monitoring on-board operations and link quality.

Figure 9:
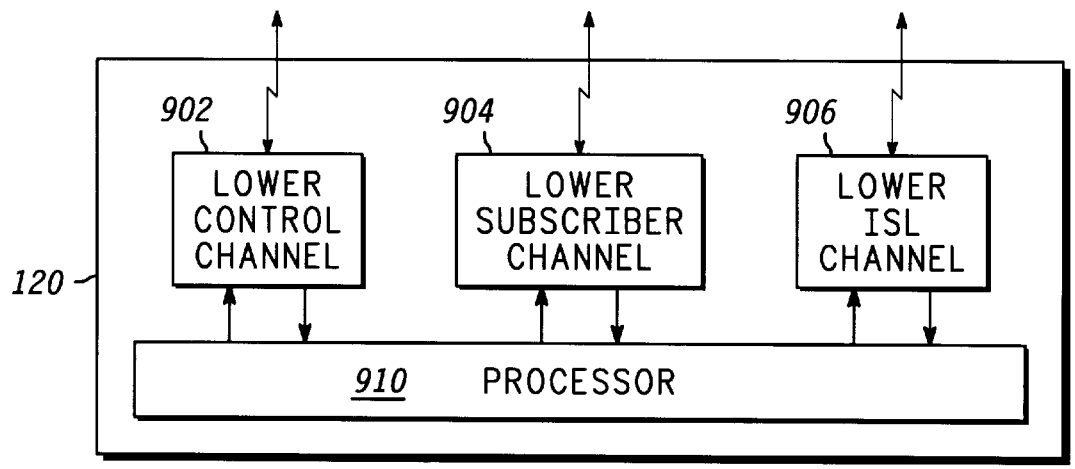
FIG. 9 shows a block diagram of a LEO satellite in accordance with a preferred embodiment of the present invention.

FIG. 9 shows a block diagram of a LEO satellite in accordance with a preferred embodiment of the present invention. The LEO satellite comprises: lower control channel 902, lower subscriber channel 904, lower inter-satellite link (ISL) channel 906, and processor 910. Lower control channel 902 is for communicating with a system control center when a system control center is locally available. Lower subscriber channel 904 is for communicating with a subscriber equipment when instructed to do so by the system control center for time delay sensitive services. Lower inter-satellite link (ISL) channel 906 is for establishing and monitoring a inter-satellite link to another LEO satellite when the another LEO satellite is available.

Processor 910 processes messages received on any links, determines if the messages contain routing information, re-transmits some of the messages, and performs operations using information contained in the messages which are not re-transmitted.

Figure 10:
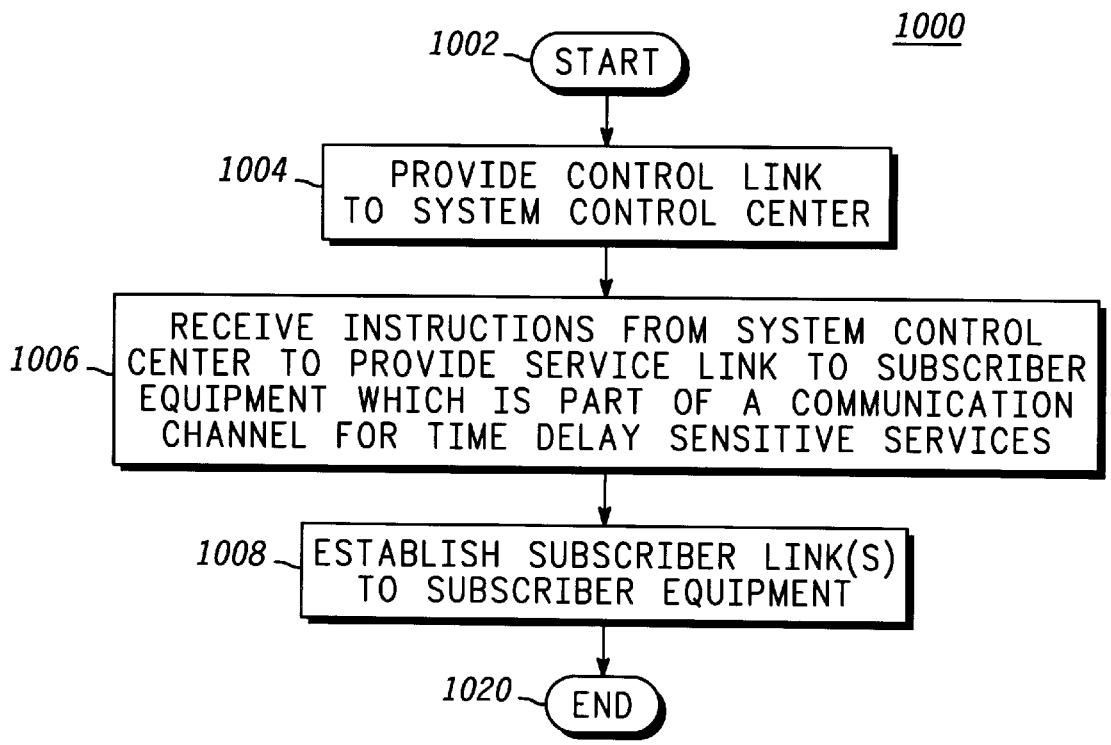
FIG. 10 shows a flowchart of a method for operating a second satellite in a hybrid constellation satellite communication system in accordance with a preferred embodiment of the present invention.

FIG. 10 shows a flowchart of a method for operating a LEO satellite in a hybrid constellation satellite communication system in accordance with a preferred embodiment of the present invention. Method 1000 starts with step 1002. In step 1004, local LEO satellite provides a control link to a system control center. A local LEO satellite is one within view of LEO antenna 312 (FIG. 3) on system control center 140 (FIG. 1).

In step 1006, a local LEO satellite receives a message from the system control center to establish a subscriber link with a particular SE. In step 1008, the originating SE establishes a subscriber link 145 with the LEO satellite which is local to the originating SE. The terminating SE establishes a subscriber link 145 with the LEO satellite which is local to the terminating SE. Method 1000 ends in step 1020.

A LEO satellite can receive a message from the SCC to hand-off the subscriber link. In a preferred embodiment, the LEO satellite uses a make-before-break strategy in establishing the new subscriber link. This means that the new subscriber link is established before the old subscriber link is broken. When the old link is terminated, the resources are restored for use in establishing other communication channels.

A LEO satellite can receive a message from the SCC to terminate a subscriber link. When the subscriber link is terminated, the resources are restored for use in establishing other communication channels.

A LEO satellite can perform maintenance tasks. For example, these maintenance tasks can include monitoring on-board operations and link quality.

An important feature of the present invention is there is no direct interaction between the two satellite constellations. Only the subscriber equipment and the system control centers require knowledge of the two satellite constellations. It should be further understood that the methods and systems of the present invention do not require the two satellites constellations to use the same frequency bands. Operating in two different frequency bands results in a minor impact to the subscriber equipment. Operating in widely separated frequency bands simplifies the radio frequency coordination between the two satellite constellations.

The methods and systems of the present invention allow the hybrid constellation satellite communication system to be deployed in stages. For example, the GEO satellites and the system control center could be deployed and put into service well before the LEO satellites are operational. When the LEO satellites become available, the appropriate changes can be made in the software and the delay sensitive services can be transferred to the LEO satellites.

The methods and systems of the present invention can also allow the merging of two systems that were originally built to operate independently. Using the signaling and control design of the present invention can allow the two systems to merge, as long as the appropriate changes could be made to the space vehicle software.

In alternate embodiments of the present invention, the ISLs are not strictly necessary. An alternate system could be developed with transponding satellites as long as adequate ground stations and terrestrial interconnects are provided. Since the LEO satellite system would require an extensive global infrastructure to provide adequate connectivity, a more probable alternate implementation would be transponding GEO satellites and LEO satellites with ISLs.

The present invention has been described above with reference to a preferred embodiment. However, those skilled in the art will recognize that changes and modifications can be made in this preferred embodiment without departing from the scope of the present invention. While a preferred embodiment has been described in terms of using specific orbits, other descriptions or methods can also be employed. For example, a very low altitude LEO constellation could be used with a higher altitude LEO constellation or a medium earth orbit (MEO) constellation. Accordingly, these and other changes and modifications which are obvious to those skilled in the art are intended to be included within the scope of the present invention.

What is claimed is:

1. A method of operating a hybrid constellation satellite communication system comprising the steps of:
    using a first satellite to provide a control channel for initial acquisition and signaling services for subscriber equipment;
    using the subscriber equipment to request services via the control channel;
    using a system control center to select whether to use the first satellite or a number of second satellites for providing a communication channel based on requested services;
    providing a first communication channel for time delay non-sensitive services between two of the subscriber equipment using at least one first satellite, when the subscriber equipment requests the communication channel for the time delay non-sensitive services; and
    providing a second communication channel for time delay sensitive services between two of the subscriber equipment using a number of second satellites, when the subscriber equipment requests the communication channel for the time delay sensitive services.

2. The method as claimed in claim 1 wherein the first satellite is a geosynchronous satellite and the second satellites are low earth orbit satellites.

3. The method as claimed in claim 1 wherein the first satellite is a geosynchronous satellite and the second satellites are medium earth orbit satellites.

4. The method as claimed in claim 1 wherein the first satellite is a medium earth orbit satellite and the second satellites are low earth orbit satellites.

5. A method of operating a system control center in a hybrid constellation satellite communication system comprising the steps of, but not necessarily in the order shown below:
    (a) receiving a request from an originating subscriber equipment to establish a communication channel between the originating subscriber equipment and a terminating subscriber equipment;
    (b) determining if the request requires time delay sensitive services;
    (c) assigning a communication channel for time delay non-sensitive services between the originating subscriber equipment and the terminating subscriber equipment using a number of first satellites, when step (b) is false; and
    (d) assigning a communication channel for time delay sensitive services between the originating subscriber equipment and the terminating subscriber equipment using at least one second satellite, when step (b) is true.

6. The method as claimed in claim 5, further comprising the step of:
    (e) using the first satellite to provide a control channel for initial acquisition and signaling services for the originating subscriber equipment and the terminating subscriber equipment.

7. The method as claimed in claim 6, further comprising the step of:
    (f) monitoring the control channel and the communication channel.

8. A method of operating a subscriber equipment in a hybrid constellation satellite communication system comprising the steps of, but not necessarily in the order shown below:
    (a) transmitting a request from an originating subscriber equipment for a communication channel, the request being for time delay non-sensitive services or time delay sensitive services;

(b) receiving set-up information for establishing the communication channel;

(c) when the communication channel is for time delay non-sensitive services, establishing a first link to a first satellite using the set-up information; and (d) when the communication channel is for time delay sensitive services, establishing a first link to a second satellite using the set-up information.

9. The method as claimed in claim 8, further comprising the step of:

(e) using the first satellite to provide a control channel for initial acquisition and signaling services for the originating subscriber equipment and the terminating subscriber equipment.

10. The method as claimed in claim 9, further comprising the step of:

(f) monitoring the control channel and the communication channel.

11. A method of operating a satellite of a first type in a hybrid constellation satellite communication system comprising the steps of, but not necessarily in the order shown below:

receiving a request to establish a call from a subscriber equipment;

transmitting the request to a system control center using the system control center to select whether to use the satellite of the first type according to a request for time delay non-sensitive services or to use a satellite other than the satellite of the first type according to a request for time delay sensitive services for providing a communication channel based on the requested service; and establishing and monitoring a subscriber link to the subscriber equipment when instructed to do so by the system control center.

12. The method as claimed in claim 11, wherein the satellite is a geosynchronous satellite.

13. The method as claimed in claim 11, wherein the satellite is a medium earth orbit satellite.

14. The method as claimed in claim 11, further comprising the steps of:

establishing and monitoring a control link to the system control center when the system control center is available, wherein the control link to the system control center is used to re-transmit a first message to the system control center and to receive a second message from the system control center; and establishing and monitoring the subscriber link to the subscriber equipment when the subscriber equipment is available, wherein the subscriber link to the subscriber equipment is used to receive the first message from the subscriber equipment and to re-transmit the second message to the subscriber equipment.

15. The method as claimed in claim 11, further comprising the step of:

establishing and monitoring an inter-satellite link to another first satellite when the another first satellite is available.

16. The method as claimed in claim 11, further comprising the steps of:

receiving a message;

determining if the message contains routing information;

re-transmitting the message when the determining step is true; and performing operations using information contained in the message when the determining step is false.

17. The method as claimed in claim 11, further comprising the steps of:

receiving set-up information for time delay non-sensitive services to establish a communication channel with the subscriber equipment; and establishing the communication channel with the subscriber equipment.

18. A method of operating a satellite of a second type in a hybrid constellation satellite communication system comprising the steps of:

receiving a request to establish a call for ma subscriber equipment; transmitting the request to a system control center;

using the system control center to select whether to use the satellite of the second type according to a request for time delay sensitive services of to use a satellite other than the satellite of the second type according to a request for time delay non-sensitive services for providing a communication channel based on the requested service;

waiting to receive call set-up information for time delay sensitive services to establish a communication channel with subscriber equipment; and establishing a subscriber link to the subscriber equipment when instructed to do so by the system control center, wherein the system control center is responding to a request for time delay non-sensitive services.

19. The method as claimed in claim 18, wherein the satellite is a low earth orbit satellite.

20. The method as claimed in claim 18, wherein the satellite is a medium earth orbit satellite.

21. The method as claimed in claim 18, further comprising the step of:

establishing and monitoring a control link to the system control center when the system control center is available, wherein the control link to the system control center is used to re-transmit a first message to the system control center and to receive a second message from the system control center.

22. The method as claimed in claim 18, further comprising the step of:

establishing and monitoring an inter-satellite link to another second satellite when the another second satellite is available.

23. The method as claimed in claim 18, further comprising the steps of:

receiving a message;

determining if the message contains routing information;

re-transmitting the message when the determining step is true; and performing operations using information contained in the message when the determining step is false.

24. A hybrid constellation satellite communication system comprising:

a plurality of subscriber equipment, each capable of requesting time delay sensitive services or time delay non-sensitive services;

a system control center that is capable of receiving a request for services from the subscriber equipment and determining if the time delay sensitive services have been requested;

a number of first satellites which are located within a first constellation, that are capable of providing a communication channel for the subscriber equipment making a request for the time delay non-sensitive services; and a number of second satellites which are located within a second constellation, that are capable of providing the communication channel for the subscriber equipment making a request for the time delay sensitive services.

25. The system as claimed in claim 24 wherein the first satellites are geosynchronous satellites and the second satellites are low earth orbit satellites.

26. The system as claimed in claim 24 wherein the first satellites are geosynchronous satellites and the second satellites are medium earth orbit satellites.

27. The system as claimed in claim 24 wherein the first satellites are medium earth orbit satellites and the second satellites are low earth orbit satellites.

* * * * *